United States Patent Office 2,969,377
Patented Jan. 24, 1961

2,969,377
EPOXY ESTERS OF EPOXY CARBOXYLIC ACIDS

Benjamin Phillips and Paul S. Starcher, Charleston, and Donald L. MacPeek, South Charleston, W. Va., assignors to Union Carbide Corporation, a corporation of New York No Drawing. Filed Nov. 13, 1957, Ser. No. 696,040

16 Claims. (Cl. 260—348)

This invention relates to the epoxidation of unsaturated organic compounds. In one aspect this invention relates to the diepoxidation of an alpha,beta-olefinic ester of an alcohol which contains an ethylenic group at least one carbon atom removed from the ester group,

and wherein the valences of the alpha and beta carbon atoms of the carboxylic acid residue, i.e.

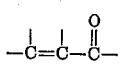

of said olefinic ester are satisfied by at least one hydrocarbon group. In another aspect this invention relates to products resulting from the above-said epoxidation process.

The synthesis of certain types of 2,3-epoxy esters is well known in the art. In 1892, Erlenmeyer produced ethyl β-phenyl-α,β-epoxypropionate by the interaction of benzaldehyde and ethyl chloroacetate in the presence of sodium. Between 1904 and 1932 Erlenmeyer's work was expanded by Darzens who generally favored the use of sodium ethoxide as the condensing agent. A modification by Darzens of his general procedure was the reaction of ketones or aldehydes with ethyl dichloroacetate and dilute magnesium amalgam, followed by hydrolysis of the product to produce β-hydroxy-α-chloroester. Treatment with sodium ethoxide provided the glycidic esters. Among the disadvantages of the Darzens process are included small yields, undesirable side reactions, wide boiling point range, e.g., 5° to 10° C., of many reported glycidic esters indicating the presence of impurities such as isomeric carbon or oxygen alkylation products, recommended use of an inert atmosphere, economic barriers presented by the high cost of starting materials, and others.

A similar reaction with methyl sorbate and perbenzoic acid in chloroform over a period of from about 5 to 10 days gave only methyl 4,5-epoxy-2-hexenoate and not the 2,3-epoxy or glycidic type of ester [1]. Another method reported in the literature involved the reaction of methyl crotonate and perbenzoic acid to prepare methyl 2,3-epoxybutyrate [2]. A yield of 44 percent was obtained by a procedure involving a reaction period of several months at 8° C. in the absence of light. A most recent work reported the epoxidation of acrylate, α-methacrylate, and crotonate esters by the use of the prohibitively expensive peroxytrifluoroacetic acid in a system buffered with disodium hydrogen phosphate. Almost universally a solvent such as methylene chloride or ethylene dichloride was required to minimize olefin polymerization [3].

The work of several investigators was summarized by Swern (Chem. Rev., 45, 50–51) in 1949 with respect to the epoxidation of alpha,beta-unsaturated esters with perbenzoic acid. His conclusions stated that the reaction of perbenzoic acid with an olefin bearing a carbonyl or carboalkoxy (—COOR) group in close proximity to the ethylenic bond was either slowed down to an exaggerated degree or prohibited by the presence of that group.

The present invention contemplates the preparation of novel diepoxide compounds by the reaction of peracetic acid with an "alpha,beta-olefinic ester of an alcohol which contains an ethylenic group at least one carbon atom removed from the ester group,

and wherein the valences, collectively, of the alpha and beta carbon atoms of the carboxylic acid residue, i.e.

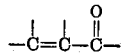

of said olefinic ester are satisfied by at least one hydrocarbon group." By the above-quoted term, i.e., "alpha,beta-olefinic ester, etc." employed as a reagent in the instant process, as used herein, is meant an olefinically unsaturated ester wherein the carboxylic acid residue of said ester contains the double bond in the 2-position, i.e.

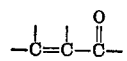

wherein the valences, collectively, of the alpha and beta carbon atoms of said carboxylic acid residue are satisfied by at least one hydrocarbon group; wherein the alcohol residue of said ester contains an ethylenic group that is at least one carbon atom removed from the ester group, e.g., alkenyl, cycloalkenyl, and cycloalkenylalkyl alcohol residues, —O—R, which contain ethylenic unsaturation at least one carbon atom removed from the oxygen linkage; and wherein the ester molecule is composed of carbon, hydrogen and oxygen atoms, said oxygen atoms being present in ester linkage only, i.e.

For brevity, the above-quoted term will oftentimes be hereinafter referred to as an "alpha,beta-olefinic ester of an olefinic alcohol," or briefer yet, as an "alpha,beta-olefinic ester."

Accordingly, one or more of the following objects will be achieved by the practice of this invention.

It is an object of this invention to provide a novel process for preparing diepoxide compounds by the epoxidation of an organic alpha,beta-olefinic ester of an olefinic alcohol, with peracetic acid as the epoxidizing agent. It is another object of this invention to prepare novel diepoxide compounds i.e., epoxyalkyl, epoxycycloalkyl, and epoxycycloalkyl-substituted alkyl glycidic esters, resulting from the aforesaid epoxidation process. It is a further object of this invention to provide a novel diepoxidation process wherein complicating and undesirable side reactions are minimized. Other objects will become apparent to those skilled in the art in the light of the instant specification.

In order to facilitate the understanding of the instant invention the alpha,beta-olefinic esters employed as reagents in the instant epoxidation process are depicted by the following general formula:

(I) 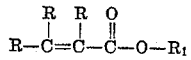

wherein each R, individually, can be a hydrogen atom or a hydrocarbon group except that one of the three variables designated as R is always a hydrocarbon group, for example, an alkyl, aryl, aralkyl, alkaryl, or a cycloalkyl group; and wherein $R_1$ is an alkenyl, cycloalkenyl, or a

---

[1] Heinanen: Suomen Kemistilehti 11B, 2–3 (1938).
[2] Dry and Warren: J. South African Chem. Inst. 6, 14–16 (1953).
[3] Emmons and Pagano: J. Am. Chem. Soc. 77, 89 (1955).

cycloalkenylalkyl radical containing ethylenic unsaturation at least one carbon atom removed from the ester group. In a preferred aspect one or more of the R variables is an alkyl group. Exemplary radicals for R include, among others, methyl, ethyl, propyl, isopropyl, butyl, amyl, isoamyl, hexyl, 2-ethylhexyl, octyl, 3,5-dimethyloctyl, decyl, dodecyl, octadecyl, cyclopentyl, cyclohexyl, phenyl, tolyl, butylphenyl, benzyl, phenethyl, phenylpropyl, and the like. Illustrative radicals for $R_1$ include, allyl, crotyl, α-methylallyl, 3-butenyl, 2,3-dimethylcrotyl, 2-ethyl-3-butenyl, 3-pentenyl, 4-pentenyl, 2-methyl-3-ethyl-4-pentenyl, 1,2-dipropyl-4-hexenyl, 2-ethyl-2-hexenyl, 3-butyl-6-octenyl, 2-cyclopentenyl, 3-cyclopentenyl, 3-cyclohexenyl, alkyl-substituted cycloalkenyl, 6-methyl-2-cyclohexenyl, 5-butyl-2-cyclopentenyl, 6-methyl-3-cyclohexenylmethyl, 5-amyl-3-cyclohexenylmethyl, alkyl-substituted cycloalkenylalkyl, 1-lower alkyl-substituted cyclohexenylalkyl, cinnamyl, 4-phenyl-2-pentenyl, phenyl-substituted 3-alkenyl, cycloalkyl-2-alkenyl,4-cyclohexyl-2-hexenyl, and the like.

Typical α,β-olefinic ester compounds conforming to structural Formula I supra which can be diepoxidized by the practice of this invention include, among others, allyl α-methylacrylate,
allyl α-ethylacrylate,
allyl β-propylacrylate,
allyl α-ethyl-β-propylacrylate,
allyl α-ethyl-β-amylacrylate,
α-methylallyl α-methylcrotonate,
α-methylallyl α-ethyl-β-propylacrylate,
crotyl crotonate,
crotyl α,β-dimethylcrotonate,
crotyl α,β-diethyl-β-propylacrylate,
γ-butenyl α-ethyl-β-propyl-β-butylacrylate,
β-ethyl-γ-butenyl β-ethyl-β propylacrylate,
allyl α-phenylcrotonate,
crotyl β-phenethyl-β-ethylacrylate,
γ-butenyl α-benzylacrylate,
β-butyl-β-pentenyl α-tolyl-β-butylacrylate,
crotyl α-cyclohexylcrotonate,
2-cyclopentenyl crotonate,
3-cyclopentenyl α-methyl-β-propylacrylate,
6-methyl-3-cyclohexenylmethyl α-ethyl-β-propylacrylate,
5-amyl-3-cyclohexenylalkyl crotonate,
4-propyl-2-cyclopentenyl β-methyl-β-amylacrylate,
2,5-diethyl-3-cyclohexenyl β-butylacrylate,
cinnamyl β-hexyl-β-ethylacrylate,
α-phenyl-β-pentenyl α-benzylcrotonate,
phenyl-γ-alkenyl β-hexylacrylate,
cycloalkyl-β-alkenyl β-tolyl-β butylacrylate,
α-cyclohexyl-α-hexenyl α-phenethyl-β-propyl-β-amylacrylate, and the like.

The preparation of the α,β-olefinic esters characterized by Formula I above is fully discussed in the literature. For example, α,β-unsaturated acids can be prepared by the hydrolysis of an α,β-unsaturated nitrile, which in turn can be obtained by cyanohydrination of the related carbonyl compound, followed by acetylation with acetic anhydride and pyrolysis. The α,β-olefinic ester then can be reacted with an unsaturated alcohol to produce the α,β-olefinic ester. The α,β-unsaturated acid also can be prepared by the well-known aldol condensation of aldehydes. The aldol is subsequently subjected to dehydration to yield the α,β-unsaturated aldehyde, which in turn can be oxidized to the corresponding α,β-unsaturated acid. The α,β-unsaturated acid then can be esterified with, for example, methanol to give the methyl α,β-unsaturated ester, which in turn is reacted with the appropriate olefin alcohol in the presence of, for example, sodium methoxide, to give an α,β-olefinic ester conforming to Formula I above.

The novel diepoxide compounds resulting from the epoxidation reaction are best depicted by the following structural formula:

(II)
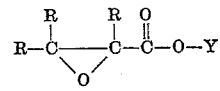

wherein the variables R have the same meanings as those shown in Formula I above; and wherein Y is an epoxyalkyl, epoxycycloalkyl, or an epoxycycloalkyl-substituted alkyl radical, the epoxyethyl group, i.e.,

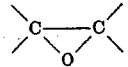

of these radicals being at least one carbon removed from the ester group, i.e., $$-\overset{O}{\underset{\|}{C}}-O-$$

In other words the variable Y corresponds to the variable $R_1$ of Formula I in which oxirane oxygen has been introduced at the site of the double bond of the $R_1$ variable.

Among the novel diepoxide compounds produced by the instant invention include, 2,3-epoxypropyl 2-methyl-2,3-epoxypropionate,
2,3-epoxypropyl 2-ethyl-2,3-epoxypropionate,
2,3-epoxypropyl 2,3-epoxyhexanoate,
2,3-epoxypropyl 2-ethyl-2,3-epoxyhexanoate,
2,3-epoxybutyl 2,3-epoxybutyrate,
2,3-epoxybutyl 2,3-dimethyl-2,3-epoxybutyrate,
2,3-epoxybutyl 2,3-diethyl-2,3-epoxyhexanoate,
3,4-epoxybutyl 2-ethyl-4-propyl-2,3-epoxyheptanoate,
2-ethyl-3,4-epoxybutyl 2-ethyl-2,3-epoxyhexanoate,
2,2-dipropyl-4,5-epoxypentyl 2-butyl-2,3-epoxyhexanoate,
2,3-epoxyhexyl 2-phenyl-2,3-epoxybutyrate,
2,3-epoxybutyl 3-phenethyl-2,3-epoxypentanoate,
2-ethyl-3,4-epoxyheptyl 2-benzyl-2,3-epoxypropionate,
2-butyl-4,5-epoxypentyl 2-tolyl-2,3-epoxyheptanoate,
2,3-epoxybutyl 2-cyclohexyl-2,3-epoxybutyrate,
2,3-epoxycyclopentyl 2,3-epoxybutyrate,
3,4-epoxycyclopentyl 2-methyl-2,3-epoxyhexanoate,
6 - methyl-3,4-epoxycyclohexylmethyl 2-ethyl-2,3-epoxyhexanoate,
5-amyl-3,4-epoxycyclohexylalkyl 2,3-epoxybutyrate,
4 - propyl - 2,3 - epoxycyclopentyl 3,5-dimethyl-2,3-epoxyoctanoate,
2,5-diethyl-3,4-cyclohexyl 4-butyl-2,3-epoxyheptanoate, and the like.

Theoretically in the diepoxidation reaction of the α,β-olefinic ester reagent as characterized by Formula I with peracetic acid, two mols of said acid can react with one mol of said ester to produce the corresponding diepoxide compound. However, it has been observed that a molar excess of peracetic acid, i.e., more than one mol of peracetic acid per mol of α,β-olefinic ester, is sufficient to introduce oxirane oxygen at the side of both carbon to carbon double bonds of said ester to thus form the corresponding diepoxide product. Consequently, the reaction period should be conducted for a period of time sufficient to consume more than one mol of peracetic acid per mol of ester employed taking into account that some peracetic acid will be lost through decomposition and the like. Generally, at least about 1.1 mols of peracetic acid per mol of ester is sufficient to produce the diepoxide product. The amount of peracetic acid consumed during the reaction can be readily determined by running an analysis on samples of the reaction mixture at various intervals to ascertain the quantity of unreacted peracetic acid therein. The upper limit regarding the amount of peracetic acid which can be employed is not narrowly critical, e.g., up to 10 mols, and higher, of peracetic acid per mol of ester reagent, and this factor is governed mainly by economic and product recovery considerations. In general, more than one mol, and preferably more than two mols, of peracetic acid per mol of ester reagent can be employed, and the reaction is conducted for a period of time sufficient to consume more than one mol of peracetic acid per mol of α,β-olefinic ester, i.e., the reaction period is conducted for a period of time sufficient to introduce oxirane oxygen at the sites of both carbon to carbon double bonds of said α,β-olefinic ester reagent.

The epoxidation reaction can be conducted at a temperature in the range of from about 0° to 100° C., and preferably from about 25° to about 90° C. As a practical matter, the choice of the particular temperature at which to effect the diepoxidation reaction depends, to an extent, on the nature of the alpha,beta-olefinic ester reagent. The reaction is somewhat exothermic and cooling means, such as a water jacket encompassing the reaction vessel, can be provided to prevent any possible "runaway" temperatures.

As stated previously the reaction is conducted for a period of time sufficient to consume more than one mol of peracetic acid per mol of α,β-olefinic ester employed. Periodical analysis of samples of the reaction mixture to determine the quantity of peracetic acid consumed during the epoxidation reaction can be readily performed by the operator. For example, the operator can intermittently remove a small sample of the reaction mixture and add it, dropwise, to 50 cc. of acetic acid containing 10 cc. of saturated aqueous potassium iodide. The resulting solution will be darkly colored due to the release of iodine. Subsequently, this colored mixture is titrated with 0.1 N of sodium thiosulfate until the mixture becomes colorless. This titration is a measure of the unreacted peracetic acid from which the amount of peracetic acid consumed is readily determined. According to the correlation of the above-illustrated factors the reaction period which is necessary to effect the consumption of more than one mol of peracetic acid per mol of α,β-olefinic ester, i.e., introduce oxirane oxygen at the sites of both double bonds of said ester, can be as short as minutes in length or it can be as long as 12 hours or more, e.g., from about 30 minutes to about 18 hours.

It is desirable to conduct the epoxidation reaction with equipment which will not foster the polymerization of the α,β-olefinic ester or catalyze the decomposition of peracetic acid. Equipment constructed of glass, stainless steel, aluminum and the like has been shown to be adequate for this purpose. If desired, a polymerization inhibitor or retarder such as hydroquinone, 2,4-dinitrophenol, 2,4-dinitro-m-cresol, and the like can be incorporated into the reaction mixture in an amount sufficient to prevent possible polymerization of the α,β-olefinic ester reagent. Provision can be made for heating and/or cooling the reactor contents. A suitable reflux-type condenser can be attached as an integral part of the equipment.

The particular manner of adding the reagents, i.e., the α,β-olefinic ester and peracetic acid, to the reaction vessel is not narrowly critical. One desirable procedure is to charge the α,β-olefinic ester to the reaction vessel and subsequently heat said ester to a predetermined temperature. At this temperature, and generally under constant agitation, peracetic acid, preferably in an inert medium such as ethyl acetate, acetone, and the like, is fed to the reaction vessel. Cooling is provided, if necessary, to compensate for the heat generated by the reaction. The reaction can be terminated after more than one mol of peracetic acid per mol of α,β-olefinic ester has been consumed, or beyond this point, as desired. The reaction mixture then can be separated into its various components, such as, by fractional distillation to recover the diepoxide product.

The use of an inert organic medium is not a prerequisite in the epoxidation reaction. However, it has been observed that a faster and cleaner reaction is effected by employing the peracetic acid in an inert organic medium such as ethyl acetate, acetone, and the like. A solution comprising from about 10 to 50 weight percent of peracetic acid, based on the total weight of peracetic acid and inert organic medium, is satisfactory; from about 20 to 40 weight percent of peracetic acid, based on the solution weight, is preferred.

The relative ease in which the novel diepoxide products result from the instant epoxidation reaction between peracetic acid and the alpha,beta-olefinic ester reagent is indeed surprising. According to various authorities and experts in the epoxy field such as Swern, supra, the epoxidation of an alpha,beta-olefinic ester, i.e., an ester wherein a double bond is conjugated with a carbonyl group in the carboxylic acid portion of the ester molecule, with an epoxidizing agent such as perbenzoic acid is effected with extreme difficulty, if at all. The successful diepoxidation process afforded by the practice of the instant invention is completely unpredictable on the basis of information available in the literature. The laborious and arduous routes pursued by several skilled chemists in the epoxy field to effect the introduction of oxirane oxygen at the site of the alpha,beta double bond which is in conjugation with a carbonyl group is testimony lending to the unpredictability or the extreme difficulty encountered by a direct epoxidation route, i.e., a single-step epoxidation process. The instant invention, it is submitted, constitutes a definite and patentable advance in the epoxy art.

The advantages of the instant process are readily apparent from the single-step nature of the operation. In addition, an economic source of epoxide oxygen is utilized, i.e., peracetic acid rather than expensive haloacetates and difficultly handled agents such as sodium amide or other prohibitively expensive peroxygen chemicals such as perbenzoic acid or peroxytrifluoroacetic acid.

The novel glycidic esters of this invention are a useful class of compounds. These glycidic esters can be hydrolyzed to glycidic acids the utility of which is well recognized. Decarboxylation of the resulting glycidic acids usually yield aldehydes or ketones depending upon whether the alpha substituent of said glycidic acid is a hydrogen or an alkyl group. The addition of halogen halides with the epoxyalkyl glycidic esters yields α,β-halohydrin esters. The novel epoxyalkyl glycidic esters of this invention also can be employed as stabilizers for chlorinated rubber. The novel glycidic esters of this invention also can be polymerized with other copolymerizable monomers such as 2,2'-bis(4-hydroxyphenyl)propane to produce hard, solid resins. Such copolymerizable systems have utility in the molding art for the production of useful shaped articles.

The following examples are illustrative.

Example I

Allyl crotonate (126 grams) was inhibited with 2 grams of phenyl-beta-naphthylamine and heated to 70° C. To this was added dropwise 935 grams of a 25.4 weight percent solution of peracetic acid in ethyl acetate over a period of approximately two hours. After an additional six hours of heating at 70° C. analysis for peracetic acid indicated that slightly more than the theoretical amount of peracetic acid had been consumed. The reaction mixture was cooled and fed dropwise into a still kettle containing ethylbenzene under reflux at such a pressure as to keep the kettle temperature at or below 70° C. The ethyl acetate, acetic acid, excess peracetic acid and some ethylbenzene were removed continuously at the still head. After stripping away the excess ethylbenzene the reaction product was rapidly distilled on a one-plate column. There was obtained 81 grams of crude dioxide as a distillate representing a 57 percent yield. The crude dioxide was fractionated to yield 2,3- epoxypropyl 2,3-epoxybutyrate, a colorless liquid. The properties were as follows:

Boiling point _____ 96°–97° C./1.5 mm. of Hg.
$n_D^{30}$ _____ 1.4480.
Density, 25° C. _____ 1.158.
Purity by saponification analysis _____ 99.5 percent
Purity by HBr method for epoxide analysis _____ 89 percent.

| Elemental Analysis | Calculated for $C_7H_{10}O_4$ | |
|---|---|---|
|  | Found (percent) | Calculated (percent) |
| Carbon | 53.9 | 53.2 |
| Hydrogen | 6.66 | 6.34 |

*Example II*

A mixture of 711 grams of α-ethyl-β-propylacrylic acid, 870 grams of allyl alcohol, 1,731 grams of toluene, 3.3 grams of di(beta-naphthyl)-para-p-phenylenediamine, and a total of 9.3 milliliters of concentrated sulfuric acid. The mixture was heated under reflux on a still and the lower layer of the distillate was removed at the still head. When a titration of the kettle material indicated that the reaction was substantially complete the reaction mixture was washed three times with water, twice with 5 weight percent aqueous sodium hydroxide solution, and twice with water, approximately equal volumes of wash material per volume of reaction mixture being employed.

Distillation of the oil layer under reduced pressure gave 810 grams of allyl α-ethyl-β-propylacrylate, a colorless liquid. The properties were as follows:

Boiling point _____ 86°–87° C./5 mm. of Hg.
$n_D^{30}$ _____ 1.4512–1.4527.
Purity by saponification with alcoholic KOH _____ 100 percent.

*Example III*

To 364 grams of allyl α-ethyl-β-propylacrylate (2 mols) there was added dropwise over a period of two hours, 1,490 grams of a 25.5 weight percent solution of peracetic acid in ethyl acetate at a temperature of 50°–60° C. After heating an additional 7 hours at 60° C. and 2 hours at 70° C. analysis for peracetic acid indicated that the theoretical amount of peracetic acid had been consumed. The reaction mixture was distilled under reduced pressure with 700 grams of ethylbenzene to remove ethyl acetate and to azeotrope out the excess peracetic acid and the acetic acid by-product. After removal of the ethylbenzene the crude reaction mixture was vacuum distilled rapidly on a one-plate column. The distillate was fractionated and yielded 229 grams of a diepoxide. The diepoxide, 2,3-epoxypropyl 2-ethyl-2,3-epoxyhexanoate, was a colorless liquid having the following properties:

Boiling point _____ 114°–115° C./2 mm. of Hg.
$n_D^{30}$ _____ 1.4470.
Density, 26° C. _____ 1.054.
Purity by saponification analysis _____ 100.2 percent.
Purity by pyridine HCl method for epoxide analysis _____ 89.9 percent (calculated as the dioxide).

| Elemental Analysis | Calculated for $C_{11}H_{18}O_4$ | |
|---|---|---|
|  | Found (percent) | Calculated (percent) |
| Carbon | 61.62 | 61.5 |
| Hydrogen | 8.38 | 8.4 |

The yield was 54 percent.

*Example IV*

Ethyl α-ethyl-β-propylacrylate (510 grams), 6-methyl-3-cyclohexenylmethanol (567 grams), and sodium methoxide (10 grams) were charged to a still kettle attached to a fractionating column. The reaction mixture was then refluxed at atmospheric pressure. Ethanol (128 grams) was removed at the still head as a distillate indicating substantially complete of the reaction. At this point an amount of acetic acid (11.4 grams) sufficient to neutralize the sodium methoxide catalyst was added to the reaction mixture. The neutralize reaction mixture was subsequently transferred to a smaller still for fractionation. A distillate of 560 grams of 6-methyl-3-cyclohexenylmethyl α-ethyl-β-propylacrylate was obtained having the following properties:

Boiling point _____ 110°–112° C./0.8 mm. of Hg.
$n_D^{30}$ _____ 1.4748–1.4762.
Purity by saponification analysis _____ 100 percent.

Infrared spectrum: Consistent with that expected for 6-methyl-3-cyclohexenylmethyl α-ethyl-β-propylacrylate.

The yield was 74.7 percent.

*Example V*

A. To a flask equipped with stirrer, condenser, thermometer, and dropping funnel and containing 250.4 grams of 6-methyl-3-cyclohexenylmethyl α-ethyl-β propylacrylate, there was added dropwise over a period of one hour at a temperature of 65° C. a solution of peracetic acid in ethyl acetate (804 grams of a 28.4 weight percent solution). The temperature of the reaction mixture was maintained at 65° C. for an additional two hours and 40 minutes at which time an analysis for peracetic acid indicated that the reaction was essentially complete. The reaction mixture was subsequently added dropwise to a still kettle containing ethylbenzene heated to reflux under reduced temperature. Ethyl acetate, acetic acid, unreacted peracetic acid, and ethylbenzene were removed as a distillate. The residue was transferred to a smaller still and distilled. There was obtained 171 grams of 6-methyl-3,4-epoxycyclohexylmethyl 2 - ethyl-2,3-epoxyhexanoate having the following properties:

Boiling point _____ 154°–162° C./2.0 mm. of Hg.
$n_D^{30}$ _____ 1.4704–1.4710.
Purity by HBr analysis for epoxide _____ 87 percent.
Purity by saponification analysis _____ 100 percent.

Infrared spectrum: Consistent with that expected for assigned structure. Strong absorption bands at 12.4μ characteristic of epoxides.

B. In a manner similar to Example V–A above there can be obtained other diepoxides conforming to Formula II supra such as, for example, 6-methyl-3,4-epoxycyclohexylmethyl 2,3-epoxybutyrate having the following properties:

Boiling point _____ 142° C./1.0 mm. of Hg.
$n_D^{30}$ _____ 1.4734.
Purity by saponification analysis _____ 98 percent.

| Elemental Analysis | Calculated for $C_{12}H_{18}O_4$ | |
|---|---|---|
| | Calculated (percent) | Found (percent) |
| Carbon | 63.7 | 63.64 |
| Hydrogen | 7.96 | 7.76 |

*Example VI*

A mixture of 0.8 gram of glycidyl 2,3-epoxybutyrate and 1.14 grams of 2,2'-bis(4-hydroxyphenyl) propane was heated to 120° C. for a period of 19 hours. The temperature was then raised to 160° C. and maintained thereat for an additional six hours. The resulting product was an amber-colored tough resin.

Although the invention has been illustrated by the preceding examples, the invention is not to be construed as limited to the materials employed in the above exemplary examples, but rather, the invention encompasses the generic concept as hereinbefore disclosed. Various modifications and embodiments of this invention can be made without departing from the spirit and scope thereof.

What is claimed is:
1. 2,3-epoxypropyl 2-ethyl-2,3-epoxyhexanoate.
2. 2,3-epoxypropyl 2,3-epoxybutyrate.
3. 3,4-epoxycyclopentyl 2,3-epoxyvalerate.
4. 6-methyl-3,4-epoxycyclohexylmethyl 2,3-epoxybutyrate.
5. 6-methyl-3,4-epoxycyclohexylmethyl 2-ethyl-2,3-epoxyhexanoate.
6. A diepoxide ester having the following formula:

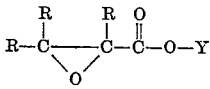

wherein each R, individually, is selected from the group consisting of hydrogen, phenyl, lower alkyl substituted phenyl, cyclopentyl, cyclohexyl, phenyl substituted lower alkyl, and alkyl containing up to 18 carbon atoms, with the proviso that at least one R is always one of the aforementioned hydrocarbon radicals, and wherein Y is a vicinal epoxy radical selected from the group consisting of epoxycyclopentyl, epoxycyclohexyl, lower alkyl substituted epoxycyclopentyl, lower alkyl substituted epoxycyclohexyl, epoxycyclohexylmethyl, lower alkyl substituted epoxycyclohexylmethyl in which the lower alkyl substituent is monovalently bonded to the cyclohexyl ring, phenyl substituted epoxyalkyl in which the epoxyalkyl moiety contains up to 12 carbon atoms, and epoxyalkyl containing up to 12 carbon atoms, the vicinal epoxy group of the aforementioned vicinal epoxy radicals being at least one carbon atom removed from the ester group of said diepoxide ester.

7. Vicinal-epoxyalkyl dialkyl substituted-2,3-epoxypropionate wherein the vicinal epoxy group of the vicinal-epoxyalkyl moiety is at least one carbon atom removed from the ester group, wherein the vicinal-epoxyalkyl moiety contains up to 12 carbon atoms, and wherein each alkyl substituent of the dialkyl substituted-2,3-epoxypropionate moiety contains up to 18 carbon atoms.

8. Vicinal-epoxyalkyl trialkyl substituted-2,3-epoxypropionate wherein the vicinal epoxy group of the vicinal-epoxyalkyl moiety is at least one carbon atom removed from the ester group, wherein the vicinal-epoxyalkyl moiety contains up to 12 carbon atoms, and wherein each alkyl substituent of the trialkyl substituted 2,3-epoxypropionate moiety contains up to 18 carbon atoms.

9. Vicinal-epoxycyclohexylmethyl dialkyl substituted 2,3-epoxypropionate wherein each alkyl substituent of the dialkyl substituted-2,3-epoxypropionate moiety contains up to 18 carbon atoms.

10. Vicinal-epoxycyclohexylmethyl trialkyl substituted-2,3-epoxypropionate wherein each alkyl substituent of the trialkyl substituted-2,3-epoxypropionate moiety contains up to 18 carbon atoms.

11. Lower alkyl substituted vicinal-epoxycyclohexylmethyl dialkyl substituted-2,3-epoxypropionate wherein the lower alkyl substituent is monovalently bonded to the cyclohexyl ring, and wherein each alkyl substituent of the dialkyl substituted-2,3-epoxypropionate moiety contains up to 18 carbon atoms.

12. Lower alkyl substituted vicinal-epoxycyclohexylmethyl trialkyl substituted-2,3-epoxypropionate wherein the lower alkyl substituent is monovalently bonded to the cyclohexyl ring, and wherein each alkyl substituent of the trialkyl substituted-2,3-epoxypropionate moiety contains up to 18 carbon atoms.

13. Vicinal-epoxycycloalkyl dialkyl substituted-2,3-epoxypropionate wherein the vicinal epoxy group of the vincinal-epoxycycloalkyl moiety is at least one carbon atom removed from the ester group, wherein the cycloalkyl ring contains more than four and less than seven carbon atoms, and wherein each alkyl substituent of the dialkyl substituted-2,3-epoxypropionate contains up to 18 carbon atoms.

14. Vicinal-epoxycycloalkyl trialkyl substituted-2,3-epoxypropionate wherein the vicinal epoxy group of the vicinal-epoxycycloalkyl moiety is at least one carbon atom removed from the ester group, wherein the cycloalkyl ring contains more than four and less than seven carbon atoms, and wherein each alkyl substituent of the trialkyl substituted-2,3-epoxypropionate contains up to 18 carbon atoms.

15. Lower alkyl substituted vicinal-epoxycycloalkyl dialkyl substituted-2,3-epoxypropionate wherein the lower alkyl substituent is monovalently bonded to the cycloalkyl ring, wherein the vicinal epoxy group of the lower alkyl substituted vicinal-epoxycycloalkyl moiety is at least one carbon atom removed from the ester group, wherein the cycloalkyl ring contains more than four and less than seven carbon atoms, and wherein each alkyl substituent of the dialkyl substituted-2,3-epoxypropionate moiety contains up to 18 carbon atoms.

16. Lower alkyl substituted vicinal-epoxycycloalkyl trialkyl substituted-2,3-epoxypropionate wherein the lower alkyl substituent is monovalently bonded to the cycloalkyl ring, wherein the vicinal epoxy group of the lower alkyl substituted-vicinal epoxycycloalkyl moiety is at least one carbon atom removed from the ester group, wherein the cycloalkyl ring contains more than four and less than seven carbon atoms, and wherein each alkyl substituent of the trialkyl substituted-2,3-epoxypropionate moiety contains up to 18 carbon atoms.

References Cited in the file of this patent
UNITED STATES PATENTS

| 2,458,484 | Terry et al. | Jan. 4, 1949 |
| 2,493,090 | Shelton et al. | Jan. 3, 1950 |
| 2,730,531 | Payne et al. | Jan. 10, 1956 |
| 2,786,066 | Frostick et al. | Mar. 19, 1957 |
| 2,794,029 | Phillips et al. | May 28, 1957 |
| 2,826,592 | Mueller et al. | Mar. 11, 1958 |

OTHER REFERENCES

Braun: J.A.C.S., vol. 52, pp. 3185–3188 (1930).
Swern: J.A.C.S., vol. 69, pp. 1692–1698 (1947).